United States Patent
Wang

(10) Patent No.: US 7,909,996 B2
(45) Date of Patent: Mar. 22, 2011

(54) NANO-GRANULE FUEL AND ITS PREPARATION

(76) Inventor: Wenhao Wang, Beijing (CN)

( * ) Notice: Subject to any disclaimer, the term of this patent is extended or adjusted under 35 U.S.C. 154(b) by 898 days.

(21) Appl. No.: 10/554,081

(22) PCT Filed: Apr. 23, 2004

(86) PCT No.: PCT/CN2004/000391
§ 371 (c)(1),
(2), (4) Date: Oct. 21, 2005

(87) PCT Pub. No.: WO2004/094570
PCT Pub. Date: Nov. 4, 2004

(65) Prior Publication Data
US 2006/0191190 A1  Aug. 31, 2006

(30) Foreign Application Priority Data

Apr. 23, 2003  (CN) .................. 03 1 22967

(51) Int. Cl.
*F02M 27/04* (2006.01)
(52) U.S. Cl. .............. 210/222; 44/628; 44/639
(58) Field of Classification Search .......... 44/300, 44/639; 241/21, 24.14; 110/218, 342, 347; 210/222
See application file for complete search history.

(56) References Cited

U.S. PATENT DOCUMENTS

| | | |
|---|---|---|
| 3,398,087 A | 8/1968 | Lieber et al. |
| 3,513,044 A | 5/1970 | Ishihashi |
| 4,605,523 A | 8/1986 | Smillie |
| 4,933,151 A | 6/1990 | Song |
| 5,918,636 A | 7/1999 | Mitchell et al. |
| 5,980,700 A | 11/1999 | Iritani |
| 5,985,153 A * | 11/1999 | Dolan et al. .............. 210/695 |
| 6,000,382 A | 12/1999 | Albisetti |
| 2004/0074760 A1 | 4/2004 | Portnoff et al. |
| 2006/0287560 A1 | 12/2006 | Xie |
| 2007/0062104 A1 | 3/2007 | Smith |

FOREIGN PATENT DOCUMENTS

| | | |
|---|---|---|
| CN | 89213334.1 | 9/1990 |
| CN | 2067655 U | 12/1990 |
| CN | 89213344 | 12/1990 |

(Continued)

OTHER PUBLICATIONS

FTC Halts Bogus Claims for "Fuel Saving" Device, http://www.ftc.gov/opa/2006/08/savegas.shtm, Aug. 22, 2006, Federal Trade Commission.*

(Continued)

*Primary Examiner* — Ellen M McAvoy
*Assistant Examiner* — Ming Cheung Po
(74) *Attorney, Agent, or Firm* — Wood, Herron & Evans, LLP

(57) ABSTRACT

The present invention discloses a nano-granule fuel oil, which substantially contains no granule greater than 10 nm. This nano-granule fuel oil can be obtained by treating conventional fuel oils under a magnetic field with a air gap magnetic field intensity of at least 8000 Gauss and a magnetic field gradient of at least 1.5 tesla/cm. The nano-granule fuel oil of the present invention significantly improves the combustion degree of fuel oil as compared with the conventional fuel oils. Its application can considerably economize fuel oil and reduce the emissions of CO and the like in tail gas.

5 Claims, 4 Drawing Sheets

FOREIGN PATENT DOCUMENTS

| | | |
|---|---|---|
| CN | 2120189 U | 10/1992 |
| CN | 92206719.8 | 10/1992 |
| CN | 1121560 | 5/1996 |
| CN | 1121560 A | 5/1996 |
| CN | 94113646.9 * | 5/1996 |
| CN | 2405399 Y | 9/2001 |
| CN | 1422934 | 6/2003 |
| CN | 1422934 A | 6/2003 |
| EP | 0 791 746 | 8/1997 |
| EP | 0852291 | 7/1998 |
| EP | 0852291 A1 | 7/1998 |
| GB | 1458261 | 12/1976 |
| NZ | 328438 | 10/2000 |
| WO | 96/12885 | 5/1996 |

OTHER PUBLICATIONS

Translation of ZL94113646.9.*
Form PCT/ISA/210, International Search Report for PCT/CN2004/000391, Jul. 2004.

* cited by examiner

NANO-GRANULE FUEL AND ITS PREPARATION

TECHNICAL FIELD

The invention relates to a fuel oil, especially a fuel oil substantially consisting of nano-granules, and the preparation method for the same.

BACKGROUND ART

The molecules of various conventional fuel oils exist in form of molecule clusters. Each molecule cluster consists of several dozens to hundred thousands molecules, forming granules of several dozens to hundreds nanometers in diameter. Such large clusters make the atomizing of the fuel oil deteriorate. When the fuel oil is burning, the clusters are hard to combust completely in an instant. Especially under the limited condition of motor cylinder explosion, the fuel oil is even harder to be burned completely. Therefore, the thermo-machine efficiency of the fuel oil in the internal-combustion engine is limited to about 38% or less, and it will generate much thermo-pollution and chemical pollution.

For long people have been looking for various methods of improving the fuel oil combustion rate. One type of methods is to add different additives into the fuel oil; while the other is to use electromagnetic field to treat the fuel oil. The early products of magnetized fuel savers used both the magnetic field and the static electric field simultaneously to treat the fuel oil. An example of this is the DJ series fuel savers, which use two permanent magnets with 1200 Gauss magnetic intensity of south poles. The south poles are placed opposite to each other with a gap of 2.8-3 mm through which the fuel oil flows. This technical solution applied a static electric field to the fuel oil at the same time.

China Patent ZL89213334 discloses a magnetized fuel saver. The saver uses two permanent magnets with the N pole surface's magnetic field intensity of 4300-4600 Gauss and the intrinsic coersivity of 15000-18000 Oersted. The N poles are placed opposed to each other, leaving a gap of 0.5-1.1 mm and the fuel oil flowing through the gap to be treated by the magnetic field. This technical solution need not apply any additional static electric field.

China patent ZL92206719.8 discloses a dual cavity magnetized fuel saver. The technical solution of this patent employs three cylindrical permanent magnets. One of the magnets is placed inside of the magnetic filter cavity. It is said that the function of this magnet is to magnetize the fuel oil and to adsorb the iron magnetic materials in the fuel. The N poles of the other two magnets face to each other and leave a gap of 0.5-1.1 mm for fuel oil flowing. In one preferred embodiment, the magnet is made of NF30H material and its intrinsic coersivity is 18,000-20,000 Oersted, with the N pole face magnetic field intensity of 4,600-5,200 Gauss.

China patent ZL94113646.9 discloses an improved dual cavity magnetized fuel saver. The configuration of this fuel saver is similar to that disclosed in China patent ZL92206719.8 mentioned above. What differs is that, magnetic circuit plates are attached to each back of the two opposite positioned magnets, and also attached to the back of the magnet in the magnetic filter cavity and the bottom side of the magnetic filter cavity opposed to the magnet therein. It is said that the existence of the magnetic circuit plates has reinforced the magnetic field intensity by forming a closed magnetic circuit in the fuel saver. In addition, the permanent magnet suggested by the patent is of NF30 material built in cylindrical shape with an intrinsic coersivity of 18,000-20,000 Oersted and the N pole magnetic field intensity of 4,000-5,200 Gauss. The gap between the two opposite permanent magnets for the flow of fuel is 0.5-2.0 mm.

Although the above methods of prior art make fuel granules finer, and improve the fuel combustion to a certain extent, they cannot surely make the fuel oils fine enough to reach the nano level and improve the fuel combustion thoroughly. In addition, the small granules resulted from the methods of prior art are not stable. Therefore, these fuel savers have to be connected to the engines directly, supplying the processed fuel oil directly to the engines.

INVENTION DISCLOSURE

This invention provides a nano granule fuel oil that contains substantially no granules greater than 10 nm, preferably no granules greater than 5 nm, more preferably no granules greater than 3 nm.

The fuel oil according to the present invention can be gasoline, diesel, kerosene, heavy oil or other fuel oil or any mixture thereof in any form.

The invention also provides a method for preparing the nano granule fuel oil of the invention, comprising a step of passing a conventional fluid fuel oil with big clusters of molecules through a magnetic field having a air gap magnetic field intensity of at least 8000 Gauss and a magnetic field gradient of at least 1.5 tesla/cm in a direction intersecting with the magnetic force lines.

In the method of present invention, the said magnetic field can be formed by two permanent magnets with a magnetic intensity greater than 5,000 Gauss and an intrinsic coersivity greater than 18,000 Oersted at the N pole faces with the same poles of two permanent magnets being placed opposite to each other, leaving a gap of less than 0.5 mm.

In addition, the said magnetic field in the method of the present invention can be an alternating current magnetic field.

DETAILED DESCRIPTION OF INVENTION

The fuel oil referred to in this invention can be any oil material that can serve as fuel, including the fuel oil used by engines and by other equipments, such as the fuel oil used by boilers.

The fuel oil can be crude oil or fuel oils derived from the crude oil or biomaterials, including but not limited to gasoline, diesel, kerosene, heavy oil and bio-diesel, etc.

The nano-granule fuel oil of this invention refers to a fuel oil containing substantially no granules greater than 10 nm.

The term "containing substantially no granules greater than 10 nm" means that those granules greater than 10 nm in size accounts for less than 10% of the total weight of the fuel oil, preferably less than 5%, more preferably less than 1%, most preferably such granules are not detectable under the present technical conditions.

In one preferred embodiment, the fuel oil of this invention contains substantially no granules greater than 5 nm.

In one further preferred embodiment, the fuel oil of this invention contains substantially no granules greater than 3 nm.

Similar definition of the term "containing substantially no granules greater than 10 nm" applies to the preferred embodiments of the present invention mentioned above.

In this invention, the term "air gap magnetic field intensity" refers to the maximum value of the magnetic field intensity (also known as "the magnetic induced intensity") in the gap formed by the same polar surfaces of the magnets opposite to each other and through which the fuel oil flows.

The "magnetic field gradient" in this invention refers to the maximum value of the magnetic induced intensity gradient in the gap (i.e., the degree of space un-evenness).

The nano-granule fuel oil of this invention can keep the above-mentioned nano-granule state for not less than 12 hours, preferably not less than 24 hours, more preferably not less than 48 hours, even more preferably not less than 36 hours and most preferably for at least one week.

The nano-granule fuel oil of this invention can be obtained by passing a conventional fluid fuel oil through a magnetic field having a air gap magnetic field intensity of at least 8000 Gauss and a magnetic field gradient of at least 1.5 tesla/cm in a direction intersecting with the magnetic force lines.

Apart from the requirements on the air gap magnetic field intensity and the magnetic field gradient, this invention has no other particular requirement on the magnetic field for treating the fuel oil. The magnetic field can be generated by a permanent magnet or a combination of permanent magnets, or by an alternating current device.

In the method as mentioned above for preparing the nano-granule fuel oil of this invention, the air gap magnetic field intensity of the magnetic field for treating the fuel oil is at least 8,000 Gauss, preferably at least 10,000 Gauss, more preferably at least 12,000 Gauss, 15,000 Gauss, 18,000 Gauss, and most preferably at least 20,000 Gauss.

In the method as mentioned above for preparing the nano-granule fuel oil of this invention, the magnetic field gradient of the magnetic field for treating the fuel oil is at least 1.5 tesla/cm, preferably at least 1.6, 1.7, 1.8, 1.9, 2.0, 2.1, 2.2, 2.3, 2.4, and 2.5 tesla/cm.

In one embodiment of this invention, the magnetic field used to treat the conventional fuel oil to obtain the nano-granule fuel oil of the present invention formed by two permanent magnets having a magnetic field intensity of at least 5,000 Gauss on their N pole faces and the intrinsic coersivity of at least 18,000 Gauss, with the two poles placed opposite to each other leaving a gap less than 0.5 mm.

In this embodiment, preferably, the permanent magnet's N pole face has a magnetic intensity of at least 6,000 Gauss, more preferably at least 8,000 gauss, and most preferably at least 10,000 Gauss.

In this embodiment, preferably the permanent magnets have an intrinsic coersivity of at least 20,000 Oersted, more preferably at least 22,000 Oersted, most preferably at least 25,000 Oersted.

In this embodiment, preferably, the gap between the two permanent magnets is in the range of from less than 0.5 mm to 0.1 mm, more preferably in the range of 0.45 mm~0.20 mm, most preferably about 0.3 mm.

In this embodiment, the two permanent magnets are placed with their N poles opposite to each other or S poles opposite to each other. However, it is preferable to place them with their N poles opposite to each other.

In this embodiment, said permanent magnet can be of any of the material selected from the group consisting of N30, N33, N35, N38, N40, N43, N45, N48, and those materials having higher magnetic energy and intrinsic coersivity, and the corresponding materials with the postfix of N, M, H, SH, EH or UH (for instance N38SH).

Compared with conventional fuel oils, the nano-granule fuel oil of this invention has excellent performance and can be extensively applied to all equipment or devices that burn fuel oil.

Taking the internal-combustion engine as an example, the nano-granule fuel oil of this invention can be used on internal-combustion engines with different power levels, including but not limited to motor cycles, automobiles, trucks, high-horse-power diesel cars, tanks, boats and ships, construction machineries, power generators, and drilling machineries etc. When applied to internal-combustion engines, compared to the conventional fuel oil, the nano-granule fuel oil of the present invention exhibits such advantages as improvement of the fuel utility rate by 20-30%, the car-tail gas pollution reduced by 50-80%, and possible enhancement of vehicle power, elimination of carbon deposits, extension of engine service life and reduction of engine noise etc.

For another example, the fuel oil-consuming boilers and the industrial furnaces using the nano-granule fuel oil of the present invention can save fuel oil by 16.8-20% for the same thermo effect compared with using conventional fuel oils.

Owing to the fact that the nano-granule fuel oil of the invention can stay in the nano-granule state for long time, it expands the fuel oil's application range.

The present invention will be described in detail referring to the following specific examples and drawings but is not limited to the same.

SPECIFIC MODES OF CARRYING OUT THE INVENTION

Example 1

Figure 1:
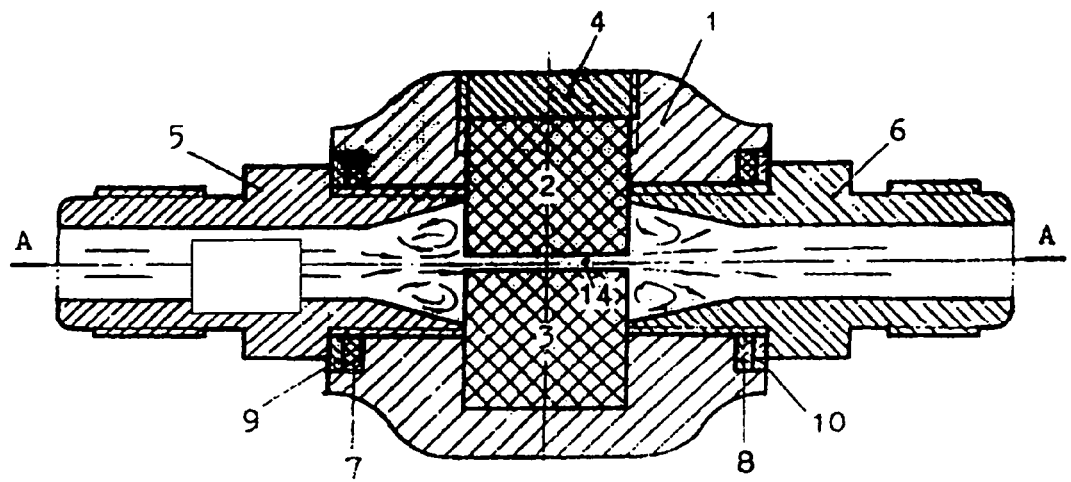
FIG. 1 shows a specific embodiment of the device used in a method for preparing the nano-granule fuel oil of the present invention.

A device similar to that disclosed in Chinese patent No. 8921334 was used to treat a conventional fuel oil to produce the nano-granule fuel oil of this invention. However, both the parameters of the magnets used in this invention and the gap between the magnets were different from the device in the above patent. See FIG. 1 for the specific configuration.

The device consisted of shell 1, two permanent magnets 2 and 3, stub 4, connection pipes 5 and 6, and seal rings 9 and 10. Shell 1 had a longitudinal passage. The two ends of the passage were attached to the connection pipes 5 and 6 through screw-threads. Shell 1 had a magnetizing cavity in the central part, communicated perpendicularly to the longitudinal passage. The magnetizing cavity accommodated two cylindrical permanent magnets 2 and 3. After the two permanent magnets were installed with the two N poles or the S poles opposite to each other into the magnetizing cavity, the top of the magnetizing cavity was sealed with the stub 4. The permanent magnets 2 and 3 were made of N35SH material and have a magnetic field intensity of about 8,000 Gauss on the N pole faces and an intrinsic coersivity of 22,000 Gauss. The gap between the two magnets for the fuel flow was 0.4 mm.

Example 2

A device similar to that disclosed in Chinese patent No. 94113646.9 was used to treat a conventional fuel oil to produce the nano-granule fuel oil of this invention. However, both the parameters of the magnets used in this invention and the gap between the magnets were different from the device in the above patent. See FIG. 2 for the specific configuration.

Figure 2:
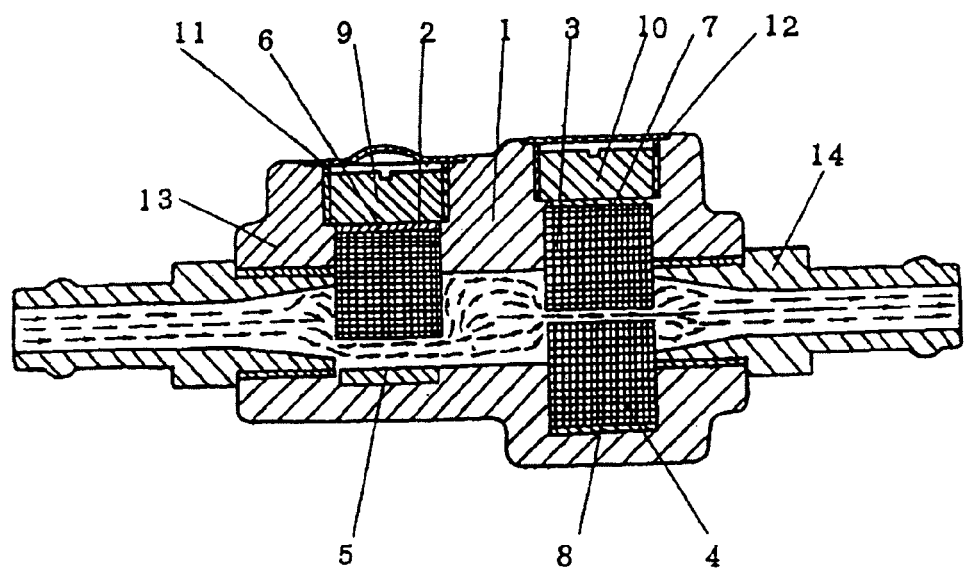
FIG. 2 shows another specific embodiment of the device used in a method for preparing the nano-molecule fuel oil of the present invention.

Referring to FIG. 2, shell 1 was made of an aluminum alloy by die-casting. Shell 1 has a longitudinal cylindrical passage and inner threads were provided on the inside walls of the both ends of the passage. In shell 1, a magnetic filter cavity and a magnetizing cavity were provided. The two cavities were both perpendicular arranged and communicated to the longitudinal passage cavity of shell 1. The two ends of the passage were connected hermetically with the connection pipes 13 and 14 through screw-threads. The connection pipes may be made of an aluminum alloy or brass. The inside flow passage of the connection pipe had a trumpet shape at one end facing outward and connected with the body of the present device. The rest part of the passage of the connection pipe was a straight pipe shape and communicated with the fuel supplying pipe, carburetor or fuel ejection pump.

The magnetizing cavity was a cylindrical hole, in which were installed two permanent magnets placed opposite to each other. A gap of 0.45 mm for fuel flow was formed between the permanent magnets 3 and 4. The two north poles (or south poles) of permanent magnets 3 and 4 were placed opposite to each other. Magnetic circuit plates were attached to the other end of each of the permanent magnets 3 and 4 in order to form a closed magnetic circuit.

The magnetic filter cavity was a stepped hole, communicating with the longitudinal passage of shell 1 and the surface of shell 1. Inside the magnetic filter cavity was installed a permanent magnet 2. A magnetic circuit plate 6 was attached to one end of the permanent magnet 2. The other end of the permanent magnetic 2 was opposite to a magnetic circuit plate 5 attached to the bottom of the magnetic filter cavity. Thus, a fixed oil flow gap of 3 mm was formed. The magnetic circuit plate 5 was installed in a concave part of the shell at the bottom of the magnetic filter cavity. It can be fixed through interference-fitting or industrial adhesive bonding.

The permanent magnets 2, 3 and 4 used there were all of cylindrical structure and made of N35SH material. The magnets had a diameter of 20 mm and a height of 12 mm. The permanent magnet had a magnetic field intensity of the N pole face of 6,000 Gauss and an intrinsic coersivity of 20,000 Oersted.

The magnetic circuit plates 5, 6, 7, and 8 were of circular plate or cylindrical shape, with a diameter of 22 mm and a thickness of 5 mm. The magnetic circuit plates can be made of such magnetic conductive material as pure iron DT4 material or silicon steel plates.

Example 3

The device similar to that used in Example 2 is used to treat the conventional fuel to produce the nano-granule fuel oil of this invention. However, both the parameters of the magnets used in this invention and the gap between the magnets are different from the device in the above patents and it does not use the magnetic circuit plates. The magnetic field intensity of the N pole faces of the permanent magnets is 8,000 Gauss and the intrinsic coersivity is 24,000 Oersted. The gap between the two permanent magnets is about 0.3 mm.

The following Examples are intended to demonstrate the physical properties and the performance of the nano-granule fuel oil of this invention.

Example 4

Small angle neutron scattering technique was used to measure the size of the granules in the fuel oil of this invention.

The National Institute of Standards and Technology (NIST) of the United States conducted tests on the fuel oil as treated by the device of Example 2 with SANS technology. Through the comparison of the two samples, one was an ordinary fuel oil, and the other was the fuel oil treated by the device of Example 2, it was found that the former contained molecular cluster granules of larger than 300 nm in size while the size of the granules in the latter was not larger than 3 nm and remained so for at least one week.

Test Method

Small angle neutron scattering (SANS) is an advanced experimental technology to probe and measure microstructure of materials. It is an especially powerful method for fluids and soft matters because of the difficulties encountered with these samples by real space probing techniques such as microscopy. The small angle neutron scattering technique measures the density distribution or fluctuation in the reciprocal space. But for most structures, specific information can be obtained about the microstructure of these samples. It is typically used to measure the granule size, shape and their distribution in complex fluids such as colloids, polymer solutions, surfactant complex, and micro-emulsions. The length scales currently available in the world's neutron laboratories are from 1 nm to 1 μm using conventional SANS instruments.

Three sets of experiments at NIST Center were performed on different samples using NG7-SANS instrument. The neutron wavelengths used were 0.60 nm and 0.81 nm, and the momentum transfer (Q, scattering wave vector) range was from 0.008 nm$^{-1}$ to 1 nm$^{-1}$, corresponding to length scales from 1 nm to 120 nm.

The fuel oil used as samples was common diesel oil obtained from a Crown Service Station in Gaithersburg, Md., US. The device for treating the fuel oil was a device of Example 1 provided by the present applicant. Samples were contained in cylindrical cells when it was tested. The neutron path length was 1 mm, the diameter of the neutron beam was 12.7 mm, and therefore the sample volume measured was 0.2 ml.

Test Results

In the three sets of experiments, the untreated fuel oil samples as obtained were measured twice within one month. The two measurements were slightly different in Q range. The results of both measurements similarly shown that the fuel samples contained molecular clusters of size larger than 300 nm, as shown by one of the curves indicated as D1 (circle) in FIG. 3. As shown in the figure, the curve increases at low-Q intensity side up to Q=0.008 nm$^{-1}$. This profile does not necessarily exhibit a Guinier shape. So the curve shape could not provide the size of the molecule clusters, because the size is outside and above the up-limit of the size scale measurable by the instrument. The up-limit of the size scale is the reciprocal of Q=0.008 nm$^{-1}$, i.e., 120 nm in radius of gyration or 310 nm in spherical diameter. But basically it can be determined that these clusters are in quasi-micron size, i.e., 0.5-2 μm.

As for the composition of these clusters, the neutron scattering instrument could not provide specific information.

However it can be definitely concluded that each of such clusters move as one integral unit. Because of the fact that most molecule structures of fuel oil are smaller than 10 nm, these clusters can be deemed as molecule clusters or correlated molecules. Due to the fact that the scattering intensity is directly proportional to the product of both the quantity of these granules and their "contrast" with the rest of the fuel, it is hard to calculate either of the quantities.

Figure 3:
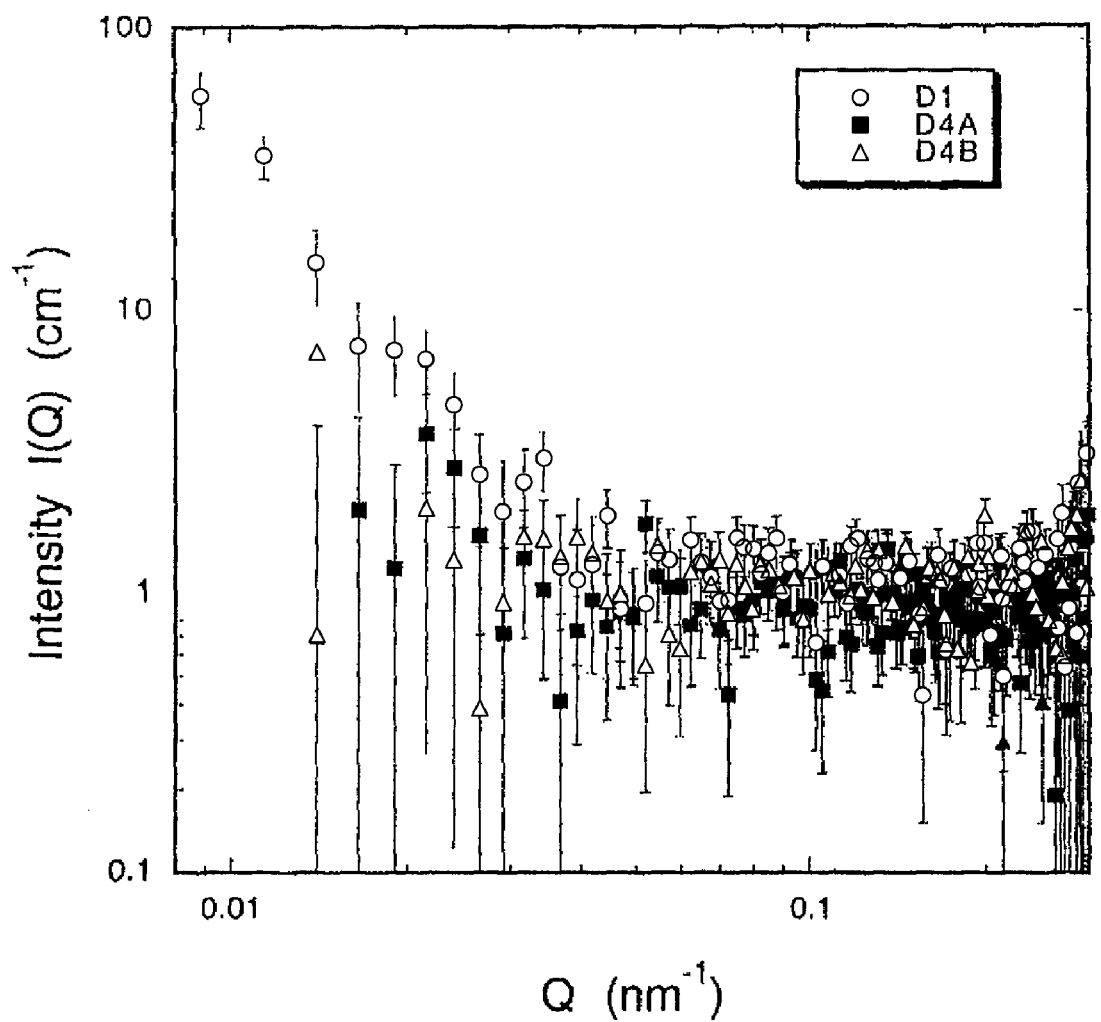
FIG. 3 shows the measurement results of the granule size of the fuel oil of the present invention by small angle neutron scattering technology.

However, the same fuel samples were treated with the device as described in Example 1 with the fuel going through the device under gravity. The collected samples were measured twice in a week using the same method as mentioned above with the Q scale of 0.008 $nm^{-1}$<Q<1 $nm^{-1}$. The test result were plotted in the same figure with the above results (D4A: squares and D4B: triangles). D4A indicates results of measurement of a sample of diesel same as D1 freshly processed by the device as described in Example 1. D4B indicates the data of the same sample D4A measured one week later. The two measurements are similar, but they are markedly different from the results of the unprocessed fuel, in that they lack the increase of the intensity in low-Q. The graduation in FIG. 3 is by logarithm. The average value of D4A and D4B is 1 $cm^{-1}$ (the scattering cross sectional area per unit volume), but the intensity of D1 in low-Q is several times bigger to tens times bigger than that of D4. In fact, the whole curve can be characterized as flat, indicating that there are no measurable granules in the measurement range (0.008 $nm^{-1}$ to 0.4 $m^{-1}$). The test was repeated twice and similar results were obtained, each using the fuel oil freshly-processed by the device in Example 1.

Conclusions

The SANS measurements show that conventional diesel fuels contain granules of size larger than 300 nm. However, these granules in the conventional sample disappear after the fuel sample is treated by the device of Example 1. The size of the granules in the treated sample is at nanometer level. No detectable granules larger than 3 nm is present in the processed fuel oil.

Example 5

The physical property changes of the nano granule fuel oil of the present invention as compared with conventional fuel oil By conventional methods, $T_2$ and $T_1$ measurements of nuclear magnetic resonance, viscosity tests and the specific gravity tests were conducted on two diesel fuel samples before and after flowing through the device as described in Example 1 at different flow rates, one at 10 L/h and the other at 20 L/h.

Figure 4:
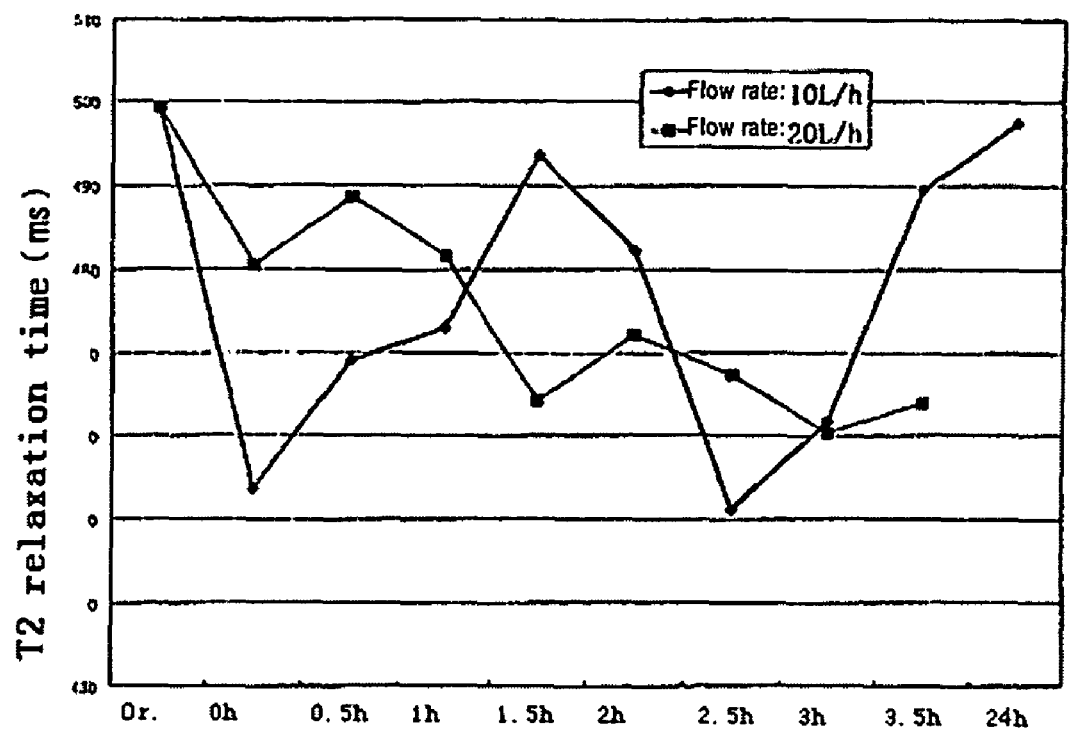
FIG. 4 shows the respective $T_2$ relaxation time of diesel oils of two different flow rates at various time points before and after treatment by the method of present invention.
Figure 5:
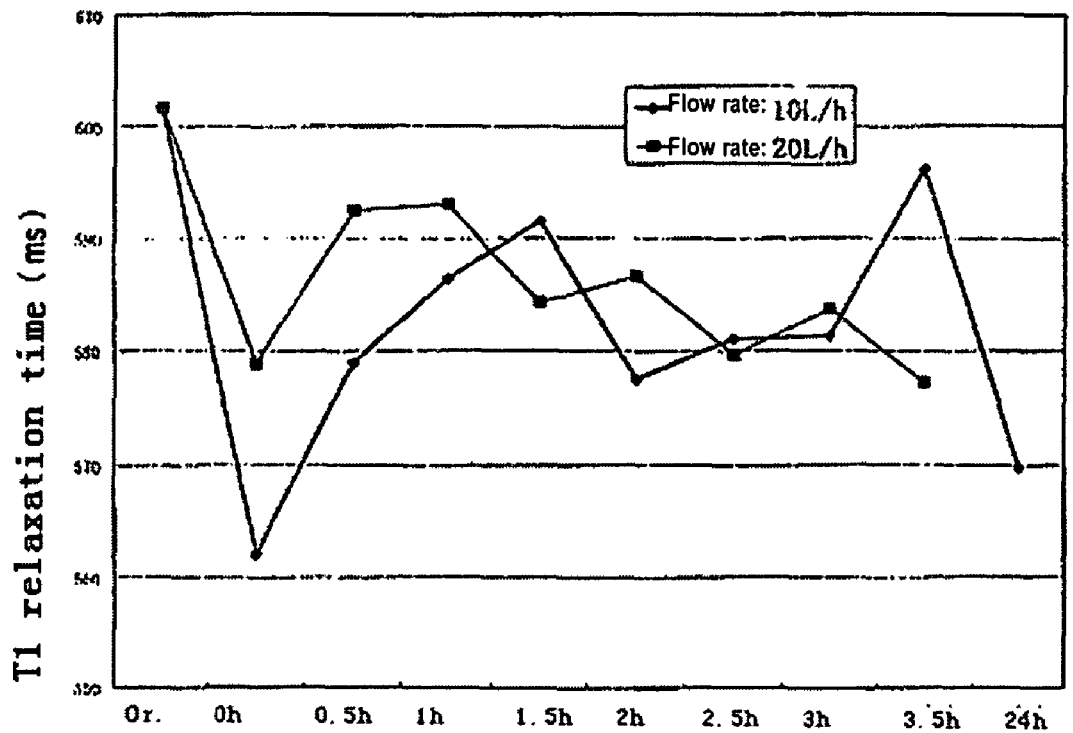
FIG. 5 shows the respective $T_1$ relaxation time of diesel oils of two different flow rates at various time points before and after treatment by the method of present invention.
Figure 6:
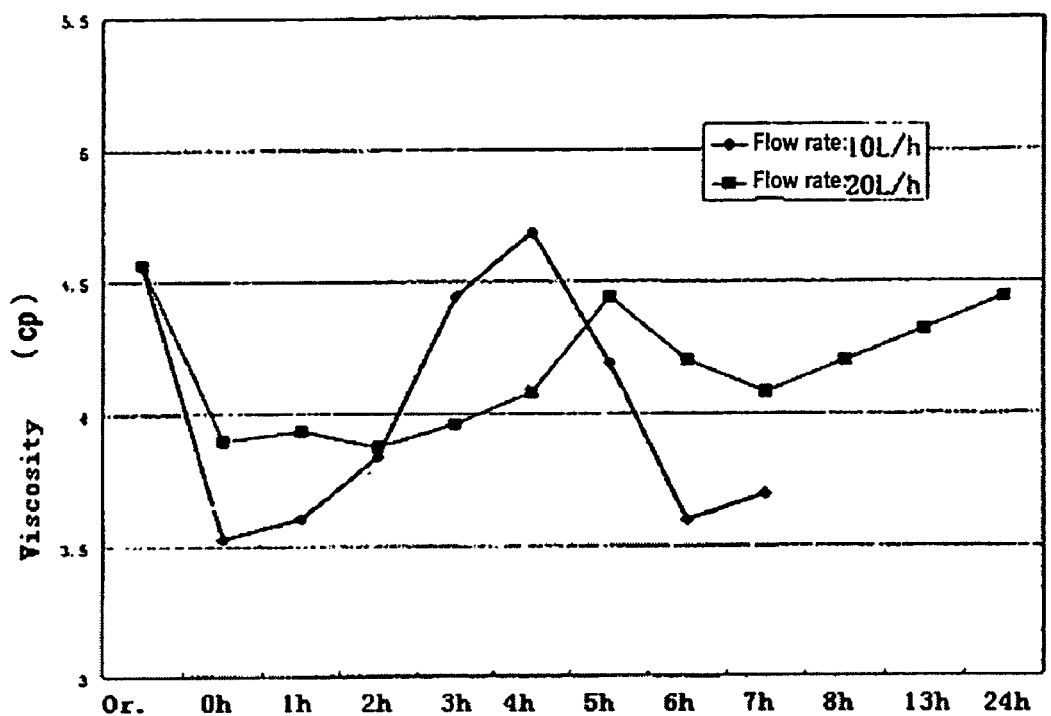
FIG. 6 shows the respective viscosity of diesel oils of two different flow rates at various time points before and after treatment by the method of the present invention.
Figure 7:
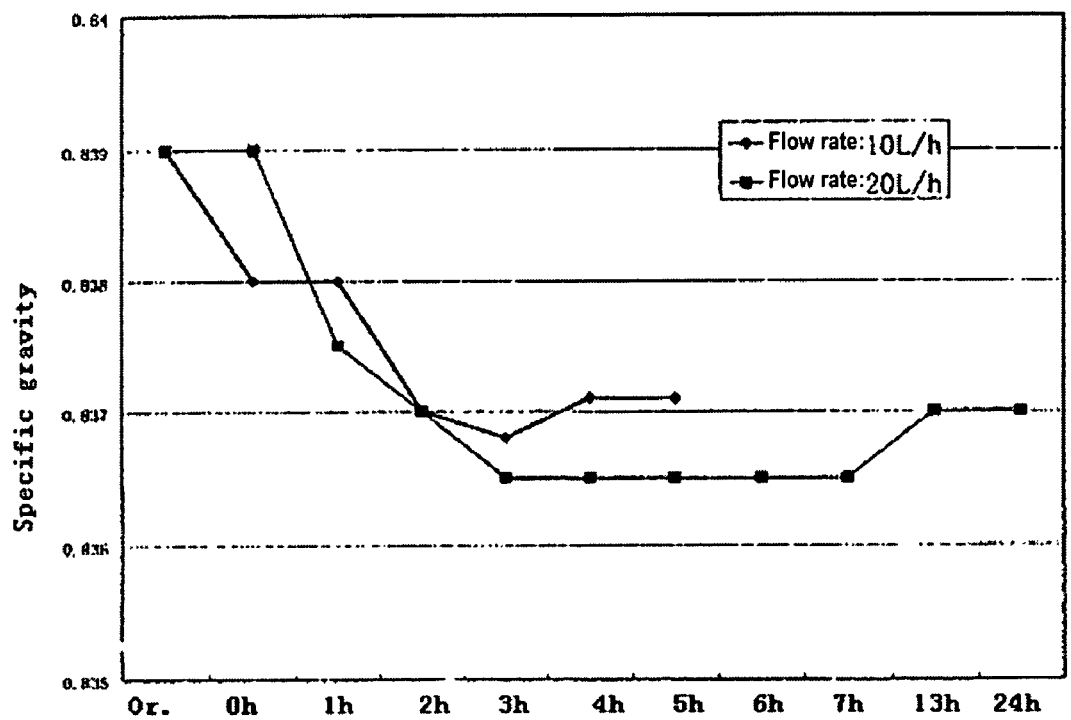
FIG. 7 shows the respective gravity of diesel oils of two different flow rates at various time points before and after treatment by the method of the present invention.

The test results are as follows:
1) $T_2$ relaxation time at different time points before and after diesel oil filtration at two flow rates (see Table 1 and FIG. 4);
2) $T_1$ relaxation time at different time points before and after diesel oil filtration at two flow rates (see Table 1 and FIG. 5);
3) Viscosity of diesel oil at various time points before and after the filtration at two flow rates (see Table 2 and FIG. 6); and
4) Specific gravity of diesel oil at various time points before and after the filtration at two flow rates (see Table 3 and FIG. 7).

TABLE 1

Measurement results of Nuclear magnetic resonance $T_2$ and $T_1$ of diesel oil at various time points before and after treatment

| Test item | | Original status | 0 H (hour) | 0.5 H | 1 H | 1.5 H | 2 H | 2.5 H | 3 H | 3.5 H | 24 H |
|---|---|---|---|---|---|---|---|---|---|---|---|
| $T_2$ Relax. Time (ms) | Flow rate 10 L/h | 499.1 | 453.6 | 469.1 | 473.0 | 493.5 | 482.2 | 451.0 | 461.7 | 489.5 | 497.4 |
| | Flow rate 20 L/h | 499.1 | 480.5 | 488.6 | 481.6 | 464.2 | 472.1 | 467.3 | 460.3 | 463.9 | |
| $T_1$ Relax. Time (ms) | Flow rate 10 L/h | 601.7 | 562.0 | 578.9 | 586.4 | 591.5 | 577.5 | 581.0 | 581.3 | 596.1 | 569.7 |
| | Flow rate 20 L/h | 601.7 | 578.8 | 592.4 | 593.0 | 584.3 | 586.6 | 579.6 | 583.7 | 577.2 | |

TABLE 2

Measurement results of the viscosity of diesel oil at various time points before and after treatment

| Test item | | Original status | 0 H | 1 H | 2 H | 3 H | 4 H | 5 H | 6 H | 7 H | 8 H | 13 H | 24 H |
|---|---|---|---|---|---|---|---|---|---|---|---|---|---|
| Viscosity (cp) | Flow rate 10 L/h | 4.56 | 3.53 | 3.61 | 3.84 | 4.44 | 4.68 | 4.19 | 3.60 | 3.70 | | | |
| | Flow rate 20 L/h | 4.56 | 3.90 | 3.94 | 3.88 | 3.96 | 4.08 | 4.44 | 4.20 | 4.08 | 4.20 | 4.32 | 4.44 |

TABLE 3

Measurement results of specific gravity of diesel oil at various time points before and after treatment

| Test item | | Original status | Test time | | | | | | | | | |
|---|---|---|---|---|---|---|---|---|---|---|---|---|
| | | | 0 H | 1 H | 2 H | 3 H | 4 H | 5 H | 6 H | 7 H | 13 H | 24 H |
| Specific Gravity | Flow rate 10 L/h | 0.8390 | 0.8380 | 0.8380 | 0.8370 | 0.8368 | 0.8371 | 0.8371 | | | | |
| | Flow rate 20 L/h | 0.8390 | 0.8390 | 0.8375 | 0.8370 | 0.8365 | 0.8365 | 0.8365 | 0.8365 | 0.8365 | 0.8370 | 0.8370 |

From the above results, it can be seen that the diesel oil has obviously changed its physical properties after passing through the device as described in Example 1, mainly including:

1) The $T_1$ and $T_2$ relaxation time of the processed diesel oil is reduced, indicating that the diesel oil molecules have been polarized by the magnetic field. FIGS. 1 and 2 show that the restoration process is a periodic one.
2) The viscosity of the processed diesel oil has obviously reduced, with the maximum reduction magnitude of 22.6% and 14.5% respectively for flow rates of 10 L/h and 20 L/h. The viscosity also has a periodic restoration process.
3) The specific gravity of the processed diesel oil has dropped, with a maximum dropping magnitude of 0.3%. After 24 hours, there is no obvious restoration on the specific gravity.

Example 6

In order to verify the performance of the nano fuel oil of the present invention, we installed the device as described in Example 2 on two Landrovers 110V8 and a DAF truck. The fuel consumption and tail gas discharge were evaluated.

Tested Vehicles:
1) The first Landrover 110V8, with a mileage reading of 20193 km
2) The second Landrover 110V8 with a mileage reading of 42814 km
3) A DAF truck with a mileage reading of 37079 km.

Test Items
  Fuel consumption of a vehicle without installing the device of the present invention, running 100 km at the same speed;
  CO discharge and smoke level of a vehicle without installing the device of the present invention;
  Fuel consumption of a vehicle with the device of the present invention installed, running 100 km at the same speed; and
  CO discharge and smoke level of a vehicle with the device of present invention installed.

Test Procedures:

Step 1:
  Before the test, record the mileage reading. Record the speed of the vehicle once the vehicle begins to work normally. Filled with fuel, the vehicle runs on a paved road at 120 km/h for 100 km. Then, the fuel tank is made full for checking the fuel consumption.

Step 2:
  A device of the present invention is installed in the vehicle after the fuel inlet filter. Then, run the vehicle under normal conditions.

Step 3:
  After using up three tanks of fuel, test the vehicle again by the same method of step 1. Repeat the test three times. The fuel consumption is indicated as the average value of the tests. When the vehicle comes back, check its CO discharge level immediately.

Test Equipment:
  CO tester: WT201 type, made by MESSER, South Africa.

Test Results:
  Running 100 km without installing the device of the present invention:

| | First Landrover | Second Landrover | DAF truck |
|---|---|---|---|
| Speed | 120 km/h | 100 km/h | 80 km/h |
| Mileage run | 99 km | 100 km | 99 km |
| Fuel consumption | 23 L | 21 L | 29 L |
| Fuel consumption/km | 0.2323 L | 0.21 L | 0.2929 L |
| Fuel consumption/ 100 km | 23.23 L | 21 L | 29.29 L |

Tail gas discharge without installing the device of the present invention:

| | First Landrover | Second Landrover | DAF truck |
|---|---|---|---|
| CO % | 6.96 | 4.23 | Heavy and black smoke |

Fuel consumption with installing the device of the present invention

| | First Landrover | Second Landrover | DAF truck |
|---|---|---|---|
| Speed | 120 km/h | 100 km/h | 80 km/h |
| Mileage run | 100 km | 100 km | 100 km |
| Fuel consumption | 16 L | 12 L | 19.3 L |
| Fuel consumption/km | 0.16 L | 0.12 L | 0.19 L |

|  | Fuel saved/100 km | | |
| --- | --- | --- | --- |
|  | 7 L | 9 L | 9.99 L |
| Rate of fuel saving | 30.4% | 42.9% | 34% |

Therefore, after installing the device of the present invention, i.e. using the nano granule fuel oil of the present invention, a fuel saving of 30.4% for the first Landrover, 42.9% for the second Landrover and 34% for the DAF truck was obtained.

The tail gas discharge with installing the device of the present invention:

|  | First Landrover | Second Landrover | DAF truck |
| --- | --- | --- | --- |
| CO % | 4.5 | 0.9 | Small amount light smoke |

Therefore, after the device of the present invention was installed, i.e. using the nano granule fuel oil of the present invention, CO discharge had dropped respectively by 35% for the first Landrover and 79% for the second Landrover. The DAF truck did not discharges black smoke any more.

The invention claimed is:

1. A method for preparing a fuel oil, comprising:
   passing a fluid fuel oil with molecular cluster granules of a size larger than 300 nm through a magnetic field formed by two like-magnetized poles located opposite to each other with a gap therebetween, the gap being less than 0.5 mm, the two like-magnetized poles each having a magnetic intensity greater than 5,000 Gauss and an intrinsic coersivity greater than 18,000 Oersted and forming an air gap magnetic field intensity of at least 8000 Gauss and a magnetic field gradient of at least 1.5 tesla/cm in a direction intersecting with magnetic force lines generated by the magnetic field.

2. A method according to claim 1, characterized in that said magnetic field has an air gap magnetic field intensity of at least 10,000 Gauss and a magnetic field gradient of at least 1.8 tesla/cm.

3. A method according to claim 1, characterized in that said magnetic field is an alternating current magnetic field.

4. The method of claim 1, further comprising:
   using the fuel oil after passing the fuel oil through the magnetic field such that the fuel oil contains substantially no granules greater than 10 nm.

5. The method of claim 1 wherein the two like-magnetized poles are permanent magnets.

* * * * *